United States Patent
Baughman et al.

(10) Patent No.: US 11,586,705 B2
(45) Date of Patent: Feb. 21, 2023

(54) DEEP CONTOUR-CORRELATED FORECASTING

(71) Applicant: International Business Machines Corporation, Armonk, NY (US)

(72) Inventors: Aaron K. Baughman, Cary, NC (US);
Martin G. Keen, Cary, NC (US);
Michael Bender, Rye Brook, NY (US);
John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 623 days.

(21) Appl. No.: 16/700,340

(22) Filed: Dec. 2, 2019

(65) Prior Publication Data

US 2021/0166162 A1 Jun. 3, 2021

(51) Int. Cl.
*G06F 17/18* (2006.01)
*G06Q 10/04* (2023.01)
*G06N 3/04* (2023.01)

(52) U.S. Cl.
CPC .......... *G06F 17/18* (2013.01); *G06N 3/0445* (2013.01); *G06N 3/0454* (2013.01); *G06N 3/0472* (2013.01); *G06Q 10/04* (2013.01)

(58) Field of Classification Search
CPC .... G06F 17/18; G06N 3/0445; G06N 3/0454; G06N 3/0472; G06N 3/08; G06Q 10/04
See application file for complete search history.

(56) References Cited

U.S. PATENT DOCUMENTS

| | | | |
|---|---|---|---|
| 8,112,176 B2 | 2/2012 | Solomon | |
| 8,811,692 B2 | 8/2014 | Prokoski | |
| 10,262,001 B2 | 4/2019 | Faith et al. | |
| 10,977,030 B2 * | 4/2021 | Weldemariam | ........... G06F 8/77 |

(Continued)

FOREIGN PATENT DOCUMENTS

| | | |
|---|---|---|
| CN | 105976049 A | 9/2016 |
| CN | 109360097 A | 2/2019 |

(Continued)

OTHER PUBLICATIONS

Han et al.; "A Deep Learning Model with Multi-Scale Skip Connections for Solar Flare Prediction Combined with Prior Information"; 2019 IEEE International Conference on Big Data (Big Data); Year: 2019 | Conference Paper | Publisher: IEEE (Year: 2019).*

(Continued)

*Primary Examiner* — Helen Rossoshek
(74) *Attorney, Agent, or Firm* — Garg Law Firm, PLLC; Rakesh Garg; Michael O'Keefe

(57) ABSTRACT

In an embodiment, a correlated forecast is computer generated by a processor that receives input data for historic values of a first input variable, creates forecast data for future values of the first input variable using the historic values of the first input variable, generates diagnostic data based on a diagnostic analysis of the forecast data, creates a first diagnostic variable that includes a first diagnostic value from a first cognitive process, generates a feature vector based on a second cognitive process that determines the feature vector by identifying a correlation between the first diagnostic variable and a second diagnostic variable, and generates a final forecast using the feature vector as an input for a cognitive forecasting process, where the first cognitive process determines the first diagnostic value based on the diagnostic data.

20 Claims, 8 Drawing Sheets

(56) References Cited

U.S. PATENT DOCUMENTS

| | | | | |
|---|---|---|---|---|
| 2010/0324936 | A1* | 12/2010 | Vishnubhatla | G06Q 40/08 |
| | | | | 715/810 |
| 2014/0079297 | A1 | 3/2014 | Tadayon et al. | |
| 2014/0324747 | A1* | 10/2014 | Crowder | G06N 3/0436 |
| | | | | 706/18 |
| 2015/0227656 | A1 | 8/2015 | Mun | |
| 2018/0276710 | A1* | 9/2018 | Tietzen | G06Q 30/0269 |
| 2019/0209022 | A1* | 7/2019 | Sobol | A61B 5/7267 |
| 2019/0286506 | A1 | 9/2019 | Cheng et al. | |
| 2019/0318304 | A1* | 10/2019 | Sewak | G06N 3/08 |
| 2021/0034960 | A1* | 2/2021 | Khapali | G06N 3/08 |
| 2021/0169417 | A1* | 6/2021 | Burton | A61B 5/4857 |
| 2021/0248514 | A1* | 8/2021 | Celia | G06Q 30/0278 |
| 2022/0224963 | A1* | 7/2022 | Herz | H04N 21/4524 |

FOREIGN PATENT DOCUMENTS

| | | |
|---|---|---|
| CN | 109389244 A | 2/2019 |
| CN | 109817338 A | 5/2019 |

OTHER PUBLICATIONS

Rathi et al.; "Human Vision Reconstruction using Brain Activity Profiles"; 2018 4th International Conference on Computing Communication and Automation (ICCCA); Year: 2018 | Conference Paper | Publisher: IEEE (Year: 2018).*

Nápoles et al.; "Nonsynaptic Error Backpropagation in Long-Term Cognitive Networks";; IEEE Transactions on Neural Networks and Learning Systems; Year: 2020 | vol. 31, Issue: 3 | Journal Article | Publisher: IEEE; Cited by: Papers (5) (Year: 2020).*

Patent Cooperation Treaty, PCT/IB2020/061129, Mar. 9, 2021.

Lai et al., Modeling Long- and Short-Term Temporal Patterns with Deep Neural Networks, Apr. 2018.

Flunkert et al., DeepAR: Probabilistic Forecasting with Autoregressive Recurrent Networks, 34th International Conference on Machine Learning, Sydney, Australia, Apr. 2017.

Mapa et al., Forecasting Time-Varying Correlation using the Dynamic Conditional Correlation (DCC) Model, May 11, 2014, https://mpra.ub.uni-muenchen.de/55861.

ip.com, Method and System for Managing End to End Demand across Stores, Geographies, and Business Units by Testing Multiple Modelling Techniques, Jun. 14, 2018, https://ip.com/IPCOM/000254250.

ip.com, Method and System for Managing End to End Demand for Large Consumer Goods Manufacturer using ARIMA, Jun. 14, 2018, https://ip.com/IPCOM/000254249.

ip.com, Learning Weights for Smart Navigation Planning, Jan. 5, 2018, https://ip.com/IPCOM/000252350.

* cited by examiner

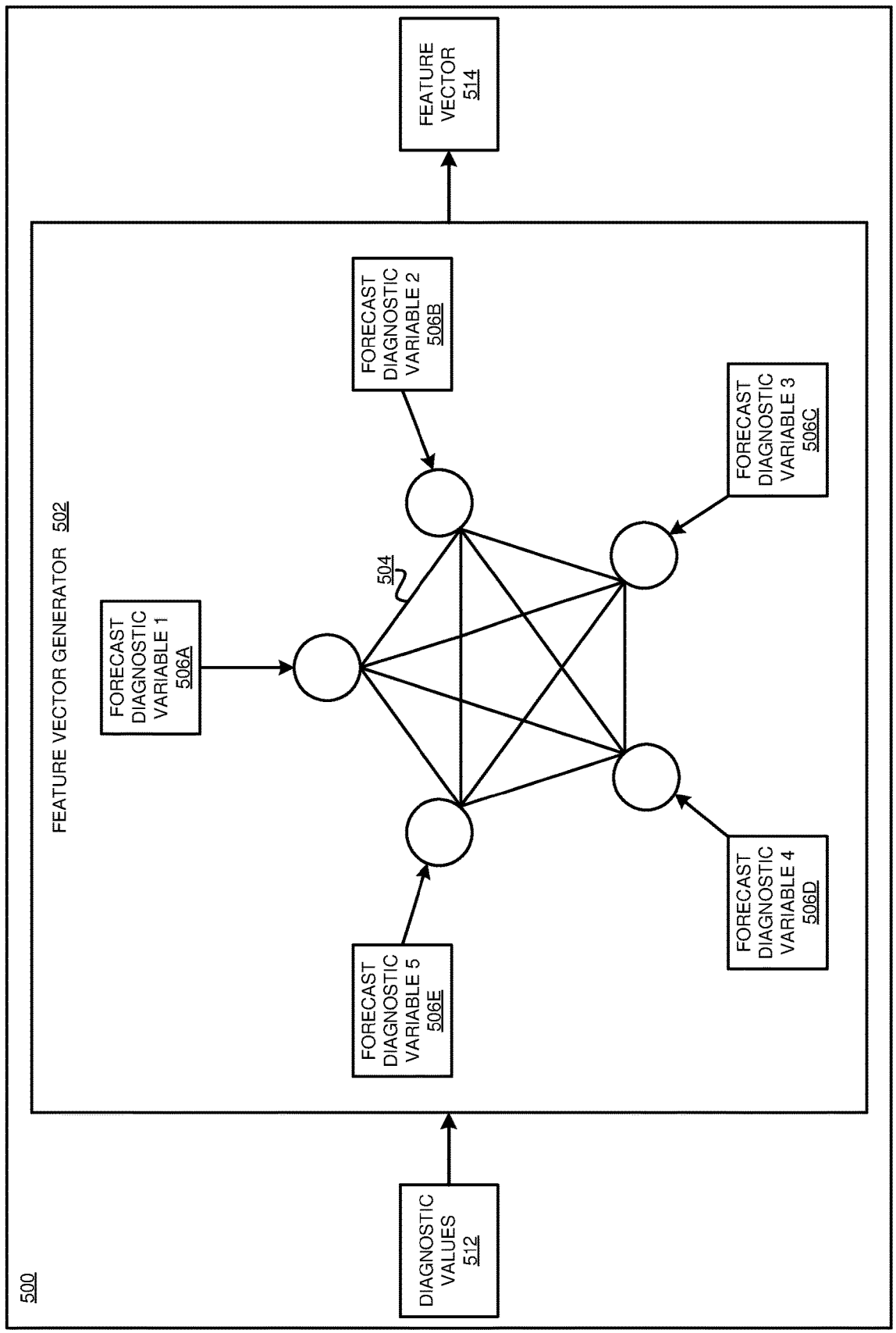

DEEP CONTOUR-CORRELATED FORECASTING

TECHNICAL FIELD

The present invention relates generally to forecasting. More particularly, the present invention relates to deep contour-correlated forecasting.

BACKGROUND

The ability to forecast future events is desirable in today's business environment. Because reliable information concerning future trends is so valuable, many organizations spend a considerable amount of human and monetary resources attempting to forecast future trends and analyze the effects those trends may ultimately produce. Thus, forecasting is an important and desirable tool in many planning processes. Forecasting business events typically involves collecting historic data and applying a forecasting model to the data.

Two classes of models that are frequently used to create forecasting models include, exponential smoothing models and autoregressive integrated moving average (ARMA) models. Exponential smoothing models describe the behavior of a series of values over time without attempting to understand why the values behave as they do. There are several different exponential smoothing models known in the art. Conversely, ARIMA statistical models allow the modeler to specify the role that past values in a time series have in predicting future values of the time series. ARIMA models also allow the modeler to include predictors which may help to explain the behavior of the time series being forecasted.

In order to effectively forecast future values in a trend or time series, an appropriate model describing the time series must be created. Creating the model which most accurately reflects past values in a time series is the most difficult aspect of the forecasting process. Eliciting a better model from past data is the key to better forecasting. Previously, the models chosen to reflect values in a time series were relatively simple and straightforward or the result of long hours and tedious mathematical analysis performed substantially entirely by the person creating the model. Thus, either the model was relatively simplistic and very often a poor indicator of future values in the time series, or extremely labor intensive and expensive with perhaps no better chance of success over a more simplistic model. Recently, the availability of improved electronic computer hardware has allowed much of the modeling aspects of forecasting to be done rapidly by computer. However, prior computer software solutions for forecasting were restricted because the number of models against which historical data were evaluated was limited and typically low ordered, although potentially there is an infinite number of models against which a time series may be compared.

SUMMARY

The illustrative embodiments generate correlated forecasts using a computer system. An embodiment includes receiving, by a processor, input data for historic values of a first input variable. The embodiment also includes creating, by the processor, forecast data for future values of the first input variable using the historic values of the first input variable. The embodiment also includes generating, by the processor, diagnostic data based on a diagnostic analysis of the forecast data. The embodiment also includes creating, by the processor, a first diagnostic variable that includes a first diagnostic value from a first cognitive process, where the first cognitive process determines the first diagnostic value based on the diagnostic data. The embodiment also includes generating, by the processor, a feature vector based on a second cognitive process that determines the feature vector by identifying a correlation between the first diagnostic variable and a second diagnostic variable. The embodiment also includes generating, by the processor, a final forecast using the feature vector as an input for a cognitive forecasting process. Other embodiments of this aspect include corresponding computer systems, apparatus, and computer programs recorded on one or more computer storage devices, each configured to perform the actions of the embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a block diagram of a feature vector generator in accordance with an illustrative embodiment;

DETAILED DESCRIPTION

Figure 1:
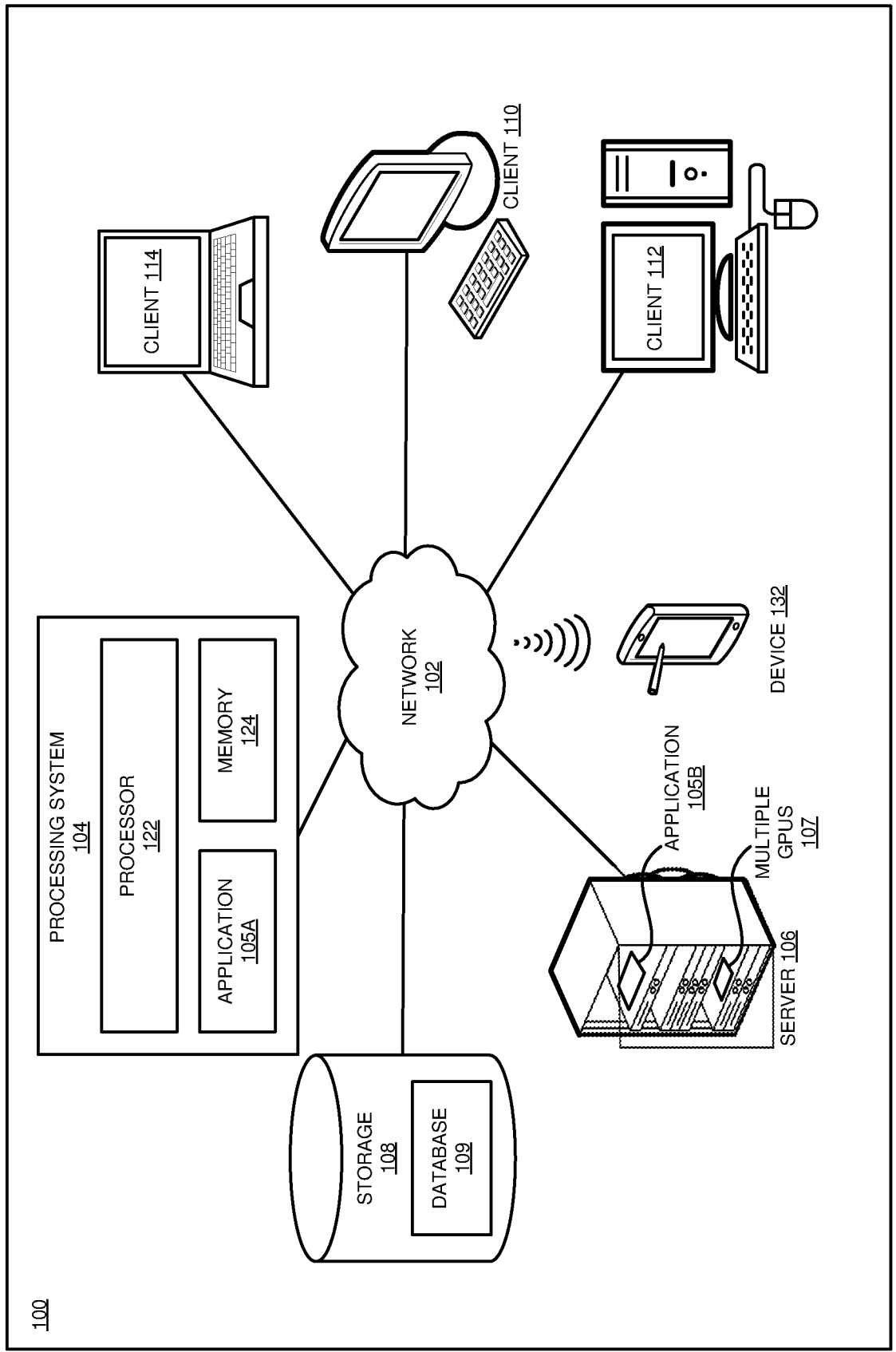
FIG. 1 depicts a block diagram of a network of data processing systems in which illustrative embodiments may be implemented.

The illustrative embodiments recognize that there is a need to account for correlations with influential time-varying factors when generating a forecast in order to produce more accurate forecasts. Also, because prior forecasting algorithms are autoregressive, an inaccuracy in forecast has the potential to propagate and affect the remainder of the forecast. For example, in a non-limiting scenario a forecast algorithm provides a forecast of network traffic for a web application to allow for scalability planning to ensure that demand is met without incurring unnecessary expense of scaling larger than necessary. However, the forecast algorithm configured according to prior practices is generated future values based on its own past values. As a result, it does not explore correlations with other varying factors that could influence demand, such as IO patterns, size of data served, location of traffic, or potentially even weather and proximity to holidays depending on the nature of the web application. As a result, the server allocation will be less than optimal, for example resulting at time in under allocation of server resources, leading to poor user experiences.

Inaccurate forecasting can also lead to unnecessary expense, such as in retail environments where purchasing too much stock can lead to added expense or loss in disposing of excess merchandise, while on the other hand, purchasing too little stock can result in lost sales opportunities for sold-out products. Similarly, in the restaurant industry, forecasting food demands can lead to lost money in food waste or lost opportunities due to under purchasing. in too little allocation that results in a sluggish user experience, or overallocation, which incurs unnecessary expense.

The illustrative embodiments recognize that the presently available forecasting tools or solutions do not address these needs or provide adequate solutions for these needs. The illustrative embodiments used to describe the invention generally address and solve the above-described problems and other problems related to accurately forecasting future values according to a process that accounts for influences on future values by other varying factors.

The illustrative embodiments recognize that there is a need to improve the ability to create more accurate and longer-range forecasts. In some embodiments, a cognitive forecasting system receives forecast variables that include input data representative of a multidimensional attribute space. The input data is organized into time-series vectors or bands of forecast variables that correspond to respective dimensions. The cognitive forecasting system generates a time-series forecast for each band of input data, and runs diagnostic tests on the resulting forecasts to check for errors. The cognitive forecasting system then uses the results of the diagnostic tests to generate respective forecast diagnostic variables in the form of time-series arrays. The cognitive forecasting system then initiates a cognitive correlation process that receives the forecast diagnostic variables as inputs and calculates correlations values, if any, associated with cause-effect relationships between each pair of the bands. The cognitive correlation process adjusts the values of the forecast diagnostic variables and outputs the adjusted values as new time-series arrays for each of the respective bands. The new correlation-adjusted array is input into a neural network to generate updated time-series forecasts, which, unlike the original input time-series forecast, now account for correlations between the different input bands.

In an embodiment, input data is organized into a plurality of univariate bands, which each correspond to a respective forecast variable. In some embodiments, the input data originates from sensors, such as sensors that convert physical attributes into electronic signals. In some embodiments, the input data originates from computer-generated logs stored in a computer memory, for example server logs, operating system logs, and application logs. In some embodiments, the input data originates from a combination of sensors, logs, and any other desired data source.

In some embodiments, the input data includes data representative of two or more forecast variables for which there is some basis for an expectation that future values of one forecast variable will have an influence on future values of the other forecast variable. For example, in an embodiment, a weather prediction system receives and stores historical data from weather sensors and other data sources that is organized into a plurality of weather-related forecast variables, such as temperature, dew point, relative humidity, precipitation, wind speed and direction, visibility, and atmospheric pressure. Each of these forecast variables can be forecast in isolation based on the variable's own historic data. However, it is understood that the values of some of these forecast variables are influenced by values of other variables, for example precipitation and wind speed at a given location can increase or decrease based on the atmospheric pressure at the same location. Therefore, in some embodiments, the cognitive forecasting system accounts for correlations between such variables when generating forecasts.

In some embodiments, a cognitive forecasting system includes a diagnostic series generator, a feature vector generator, and a cognitive forecaster. In an embodiment, the diagnostic series generator receives historic time-series data for a forecast variable and generates a time-series forecast for the forecast variable. In an embodiment, the feature vector generator receives the time-series forecast for the forecast variable and a time-series forecast for each of one or more additional forecast variables and calculates correlations values, if any, between each pair of the variables. The feature vector generator adjusts the values of the forecast diagnostic variables and outputs the adjusted values as new time-series arrays for each of the respective bands. In an embodiment, the cognitive forecaster receives the correlation-adjusted array is as an input into a neural network and outputs updated time-series forecasts, which, unlike the original input time-series forecast, now account for correlations between the different input bands.

In some embodiments, the cognitive forecasting system includes a diagnostic series generator that receives a forecast variable that includes input data for which forecasting is desired. In some embodiments, the diagnostic series generator generates a time-series forecast for each band of the received forecast variables, and runs diagnostic tests on the resulting forecasts to check for errors. The diagnostic series generator then uses the results of the diagnostic tests to generate respective forecast diagnostic variables in the form of time-series arrays.

In an embodiment, the diagnostic series generator uses a growing window forecasting process in which the diagnostic series generator receives a longest forecasting term and a step size, for example from an electronic memory or from user input. The step size sets the time period between forecasts and the forecasting term sets the longest forecasting term. As a non-limiting example, if the forecasting term is set to 24 hours and the step size is set to 1 hour, then the diagnostic series generator will generate a total of 24 forecasts that are 1 hour apart from 1 hour forward to 24 hours forward. In an embodiment, the diagnostic series generator receives a plurality of forecast variables, and uses the forecasting term to set the total time period and the step size to set the time between forecasts for each of the forecast variables. For example, if the diagnostic series generator receives 10 forecast variables, and the user sets the step size to 1 day and the forecasting term to 15 days, the diagnostic series generator will generate a total of 150 forecasts.

In some embodiments, the diagnostic series generator performs a supervised or semi-supervised learning process that includes using a lagged or split version of the input data for generating forecasts. For example, in some embodiments, the diagnostic series generator splits the input data into training and test sets. In some embodiments, half of the input data is used as input data and the other half if the input data is used as test data.

In some embodiments, the diagnostic series generator includes a forecast generator that receives forecast variables and outputs a forecast for each forecast variable, a diagnostic report generator that receives the forecasts and generates diagnostic reports about the forecasts, and a cognitive diagnostics evaluator that receives the diagnostic reports and generates adjusted forecast values as diagnostic values. In some embodiments, the diagnostic series generator includes two or more of each of the forecast generator, diagnostic report generator, and cognitive diagnostics evaluator to allow for parallel processing of multiple variables. In some embodiments, the diagnostic series generator includes one of each of the forecast generator, diagnostic report generator, and cognitive diagnostics evaluator, and multiple diagnostic series generators are added in parallel to each other to allow for parallel processing of multiple forecast variables.

In some embodiments, the forecast generator receives historical input data for a forecast variable, and forecasts future values for the forecast variable using an autoregressive model in which the evolving variable of interest is regressed on its own lagged (i.e., prior) values. Thus, an autoregressive time series analysis projects future values of a variable based on the history of that variable alone. In an embodiment, the forecast generator forecasts future values for the forecast variable using an Autoregressive Integrated Moving Average (ARIMA) model that uses parameters such as the number of time lags (or "order") of the autoregressive model and the number of times the data have had past values subtracted (or "degree of differencing"). As another example, in an embodiment, the forecast generator detects strong seasonal tendencies in the time series data of the forecast variable and applies a Seasonal ARIMA (SARIMAX) model, which uses autoregressive terms and moving average terms for seasonal parts of the ARIMA model to factor in the seasonality of the input data trend to obtain a forecast for the forecast variable.

In an embodiment, the forecast generator uses autoregressive model and a growing window forecasting process in which the forecast generator receives a longest forecasting term and a step size, for example from an electronic memory or from user input. The step size sets the time period between forecasts and the forecasting term sets the longest forecasting term. As a non-limiting example, for a forecast generator that receives v variables, if the forecasting term is set to t hours and the step size is set to s hours, then the forecast generator will generate t/s forecasts per variable for a total of (vt)/s forecasts that are s hours apart from s hours forward to t hours forward. For example, if the forecast generator receives 5 forecast variables, and the user sets the step size to 1 day and the forecasting term to 14 days, the diagnostic series generator will generate a total of 70 forecasts.

In some embodiments, the diagnostic report generator performs diagnostic tests on the forecasts prepared by the forecast generator to check for errors, also referred to as residuals or residual errors. In an embodiment, the diagnostic series generator uses the results of the diagnostic tests to as inputs to a cognitive evaluation system that learn about the forecast variables in order to make improvements to the forecasts. In some embodiments, a residual error is calculated as the expected outcome minus the forecast. In some embodiments, the diagnostic report generator collects individual residual errors across all forecasts and uses them to better understand the forecast model.

In some embodiments, the diagnostic report generator outputs one or more plots for each forecast that provide graphical indications of the results of diagnostic tests. For example, in some embodiments, the diagnostic report generator performs diagnostic testing of the forecasts that results in one or more of a standardized residual line plot, a residual histogram and estimated density plot, a residual quantile (Q-Q) plot, and a residual autocorrelation plot.

A residual line plot is a line plot that provides a visual indication of residual forecast error values relative to a central zero axis. The error values and line plot should appear random; otherwise, the presence of a pattern indicates that the forecasting model should be adjusted or replaced with a different algorithm. For example, in an embodiment, the diagnostic series generator uses an ARIMA model to calculate a forecast and generate a residual line plot. The cognitive diagnostics evaluator then analyzes the residual line plot and, if the cognitive diagnostics evaluator detects a seasonal or cyclic pattern in the input data or the plot, the diagnostic series generator informs a user to give the user an opportunity to use a different model, or in an automated embodiment the diagnostic series generator instructs the forecast generator to re-calculate the forecast using a different model, such as a SARIMAX model, which is better suited for data that includes seasonal patterns.

A residual histogram and estimated density plot (or "histogram and density plot") provides a visual indication of anomalies in the distribution of residual errors in a forecast. Ordinarily a histogram and density plot will have a somewhat Gaussian appearance. The presence of a non-Gaussian distribution or a large skew indicates that the forecasting model should be adjusted or replaced.

A residual Q-Q plot provides a visual indication of a comparison between two distributions, showing the degree of similarity or difference between the distributions. For example, in an embodiment the forecast values are compared to a Gaussian distribution and the differences are plotted as a scatter plot. The scatter plot in this example should closely follow a diagonal line extending from the origin in a direction consistent with growing values on the horizontal and vertical axes. Otherwise, the presence of significant deviations will sometimes indicate that autoregression parameter(s) are not ideal and have room for improvement. The plot will typically be useful for identifying values that deviate from expectations.

A residual autocorrelation plot provides a visual indication of a comparison between an observation and observations at prior time steps. For this plot, the expectation is to find a lack of autocorrelation between the two distributions. The plot shows autocorrelation scores relative to a threshold of significance. The presence of significant deviations will sometimes indicate that autoregression parameter(s) are not ideal and have room for improvement.

In an embodiment, the cognitive diagnostics evaluator receives the results of the diagnostic tests and performs an analysis process to generate forecast diagnostic variables in the form of time-series arrays. In some embodiments, the cognitive diagnostics evaluator examines the results looking for patterns or structure, which indicates that the errors are not random and that there is more information that a model could capture and use to make better predictions.

An embodiment of the cognitive diagnostic evaluator configures an image classification model to classify one or more plots generated by the diagnostic report generator. The plot may be viewed in real time or captured and viewed at a later time. In one embodiment, the image classification model is a neural network-based model, for example a convolutional neural network (CNN). During the configuration process, an embodiment uses labelled images of various plots to train the neural network-based model to classify a plot according to the training. For example, an image classification model that is intended to classify a plot according to error levels in the plot. The granularity of the error level detection made by the CNN will depend on the number of classes the CNN is trained to identify. For example, an image classification model that is intended to classify an image comprising a plot according to the accuracy of the forecast, for example from 0% accurate to 100% accurate.

An embodiment of the diagnostic series generator includes a forecast generator that generates a forecast and a diagnostic report generator that creates a plurality of diagnostic plots for the forecast. In one such embodiment, a cognitive diagnostic evaluator uses one or more CNNs to classify each of the diagnostic plots for the forecast. The cognitive diagnostic evaluator outputs a single value for the forecast by averaging the results of the classifications of the diagnostic plots. For example, an embodiment generates a standardized residual line plot, a residual histogram and estimated density plot, a residual quantile (Q-Q) plot, and a residual autocorrelation plot all related to a single forecast. An embodiment of the cognitive diagnostic evaluator classifies all four plots individually and assigning each a value from 0 to 100 depending on the accuracy of each plot. The accuracy values for the four diagnostic plots are then averaged together to arrive at a single number indicative of the accuracy of the forecast.

An embodiment of the diagnostic series generator receives input data for a plurality of forecast variables. The diagnostic series generator includes a plurality of forecast generators arranged in parallel to receive respective forecast variables. The diagnostic series generator also includes a plurality of diagnostic report generators arranged in parallel to receive forecasts from respective forecast generators. The diagnostic series generator further includes a plurality of cognitive diagnostic evaluators arranged in parallel, each connected to receive diagnostic information from respective diagnostic report generator.

In an embodiment, each forecast generator generates t/s forecasts per variable, where t is the forecasting term and s is the step size and both are set to a common time dimension (e.g., minutes, hours, days, etc.). Each diagnostic report generator calculates p diagnostic plots per forecast, for a total of (pt)/s plots per variable. Each cognitive diagnostic evaluator generates one diagnostic value per forecast (i.e., one for every p plots) for a total of t/s diagnostic values per variable. The diagnostic values for each variable are stored in a respective forecast diagnostic array.

In an embodiment, the cognitive forecasting system includes a feature vector generator that receives the forecast diagnostic variables from the diagnostic series generator. In an embodiment, the cognitive forecasting system includes a Hopfield network where each of the diagnostic variables becomes a node that is fully connected to every other node. Each node represents a single forecasted variable that corresponds to the diagnostic values. In an embodiment, the diagnostic values are fed into the Hopfield network to find the contribution they have to the activation function of a connected node. The contribution provides a weight to the edge connecting the nodes. From a particular node, the edges that link to each diagnostic variable are ordered. The order of the relations between forecast variables can be used to determine how far down a forecaster's forecast we should traverse when including in a final forecast.

In an embodiment, since the node values are known, the Hopfield network will process the nodes until it learns the weights of each of the connections between the nodes. Thus, in some embodiments, the weights of the Hopfield network are learned. In some embodiments, the Hopfield network includes a number of totally connected equal to the number of forecast variables 412 (shown in FIG. 4A). In some embodiments, once the Hopfield network has learned all the weights, the feature vector generator will rank the nodes according to each node's connected edges. The feature vector generator will rank the edges to each node, and then the rank the nodes according to the edge weights. The feature vector generator will then form three feature vectors, each modified according to the weights: A Long Term feature vector using the highest weighted edges, a Short Term feature vector using the lowest weighted edges, and a Middle Term feature vector using an average of the middle edge values. The vectors of each of the three feature vectors are unioned together and the three unioned feature vectors are output to the cognitive forecaster.

In an embodiment, the cognitive forecaster receives the three feature vectors and uses them as inputs into a neural network. In an embodiment, the neural network is a Long Short-Term Memory (LSTM) neural network. In an embodiment, the LSTM is trained using historic data split such that half is test data and half is training data to train the LSTM for generating revised forecasts based on the correlations calculated by the Hopfield network. In an embodiment, the cognitive forecaster uses the Middle Term feature vector as the input to the LSTM and uses the Long Term feature vector and Short Term feature vector as inputs to short term and long term memory inputs to the LSTM. In this way, the network will retain memory of different time horizons that bound the input forecast.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
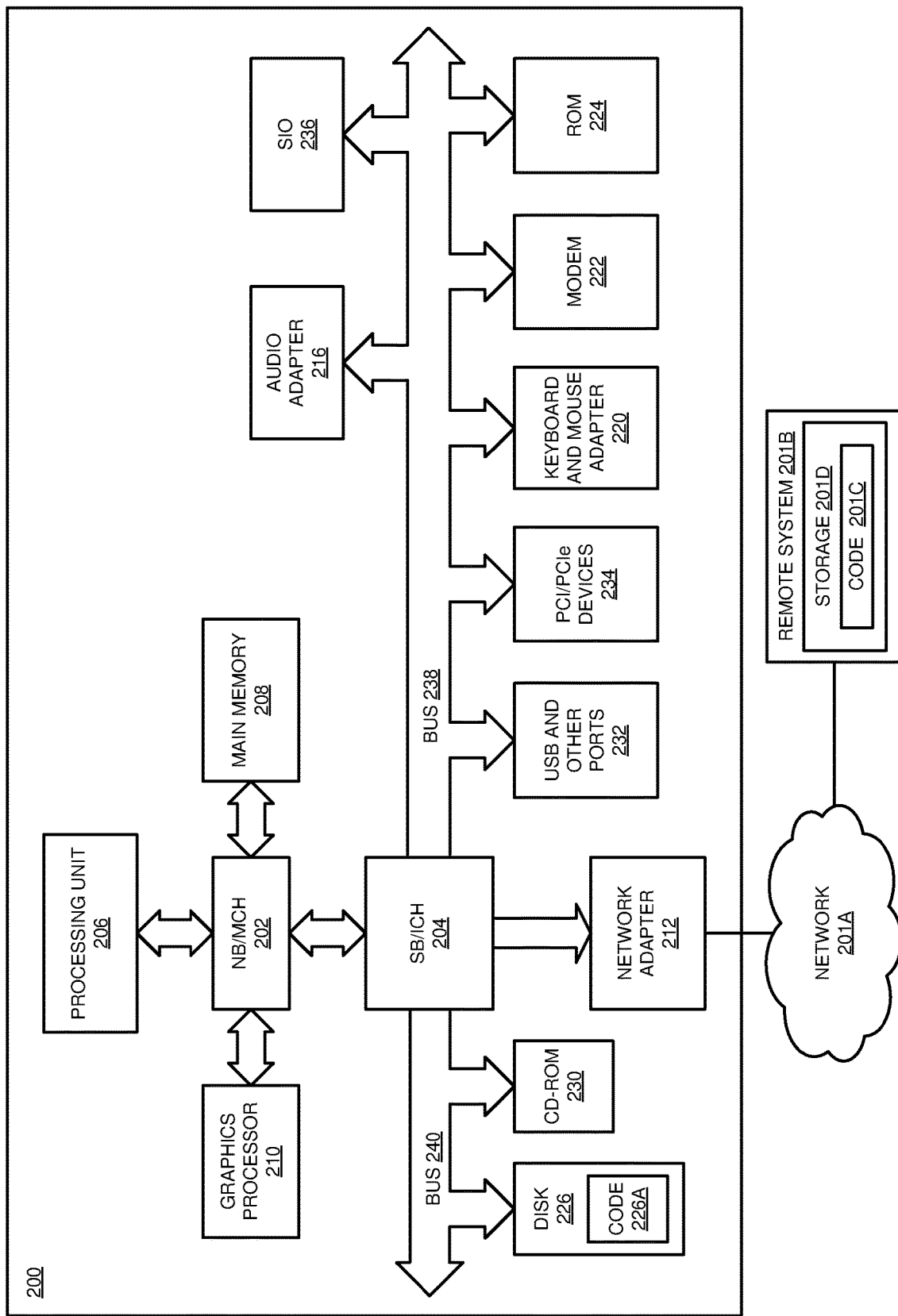
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
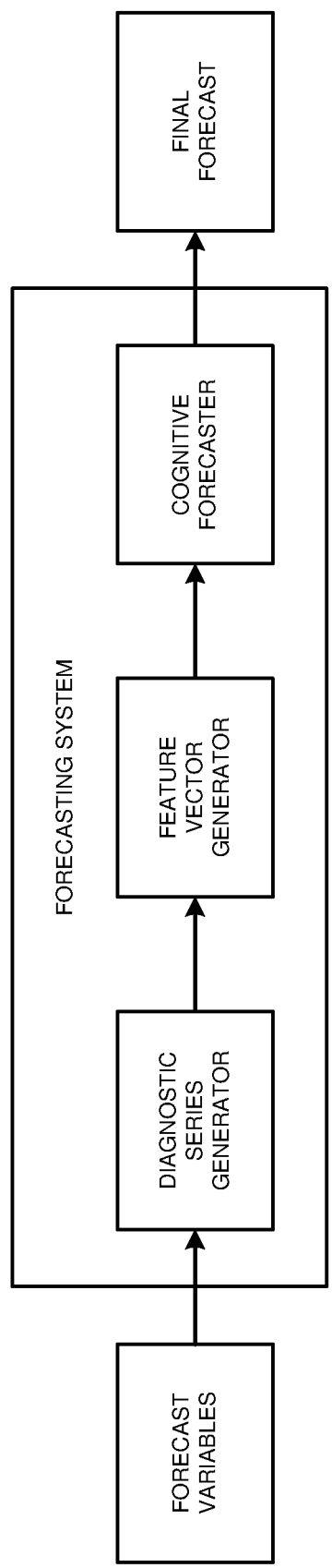
FIG. 3 depicts a block diagram of an example configuration for providing a forecasting environment in accordance with an illustrative embodiment.

With reference to FIG. 3, this figure depicts a block diagram of an example configuration 300 for forecasting in accordance with an illustrative embodiment. The example embodiment includes a cognitive forecasting system 302. In a particular embodiment, cognitive forecasting system 302 is an example of application 105A/105B of FIG. 1.

In some embodiments, the cognitive forecasting system 302 includes a diagnostic series generator 304, a feature vector generator 306, and a cognitive forecaster 308. In alternative embodiments, the cognitive forecasting system 302 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, a cognitive forecasting system 302 receives forecast variables 310 that include input data representative of a multidimensional attribute space. The input data is organized into n vectors or bands of forecast variables that correspond to respective dimensions. In an embodiment, input data is organized into a plurality of univariate bands, which each correspond to a respective forecast variable. In some embodiments, the input data originates from sensors, such as sensors that convert physical attributes into electronic signals. In some embodiments, the input data originates from computer-generated logs stored in a computer memory, for example server logs, operating system logs, and application logs. In some embodiments, the input data originates from a combination of sensors, logs, and any other desired data source.

In an embodiment, the diagnostic series generator 304 receives the forecast variables 310 and generates a time-series forecast for the forecast variable. In an embodiment, the feature vector generator 306 receives the time-series forecast for the forecast variable 308 and a time-series forecast for each of one or more additional forecast variables and calculates correlations values, if any, between each pair of the variables. The feature vector generator 306 adjusts the values of the forecast diagnostic variables and outputs the adjusted values as new time-series arrays for each of the respective bands. In an embodiment, the cognitive forecaster 308 receives the correlation-adjusted array as an input into a neural network and outputs updated time-series final forecasts 312, which, unlike the original input time-series forecast, now account for correlations between the different input bands.

Figure 4A:
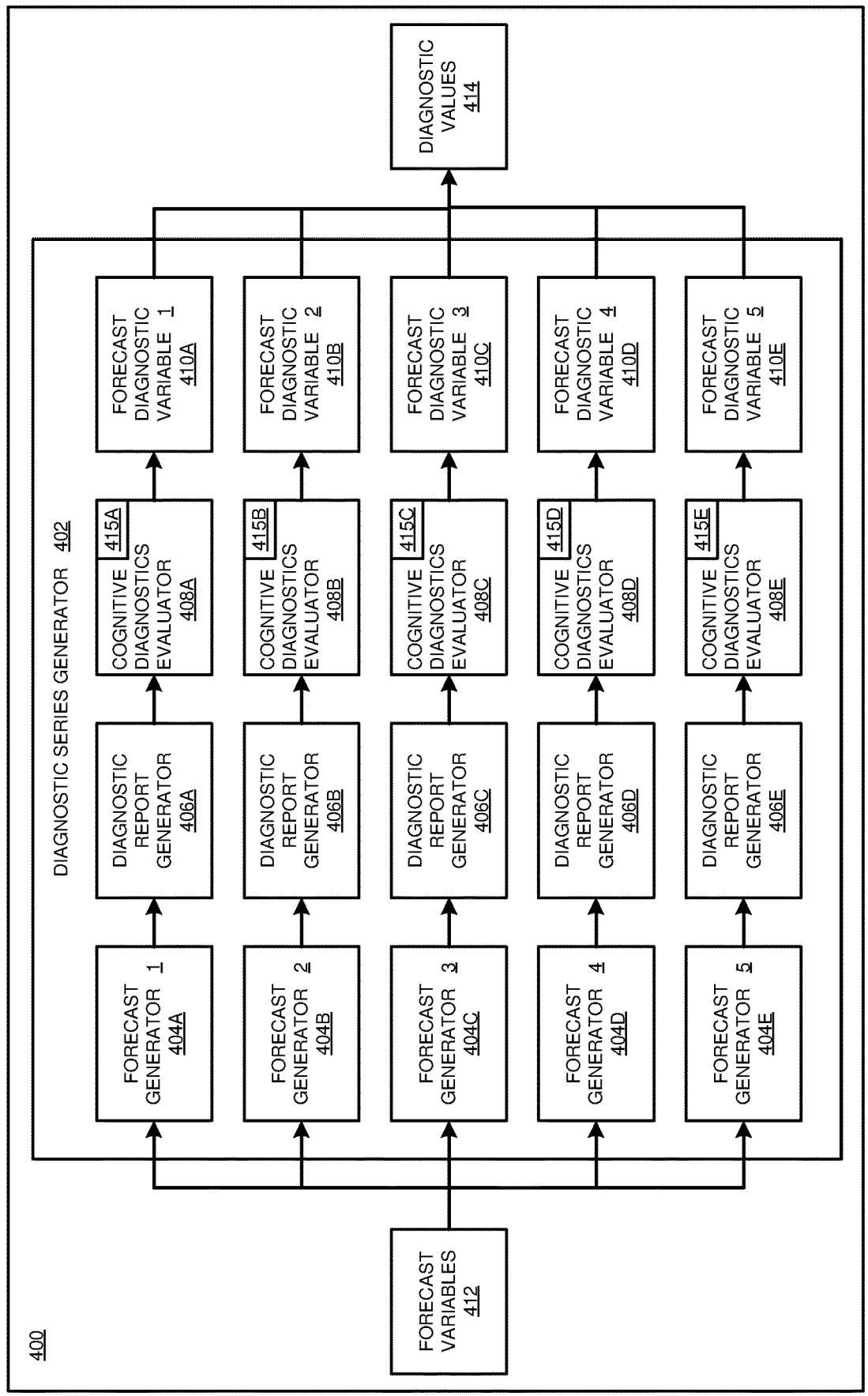
FIG. 4A depicts a diagram of an example configuration for a diagnostic series generator providing a forecasting environment in accordance with an illustrative embodiment.

With reference to FIG. 4A, this figure depicts a block diagram of an example configuration 400 in accordance with an illustrative embodiment. The example embodiment includes a diagnostic series generator 402. In a particular embodiment, diagnostic series generator 402 receives forecast variables 412 corresponding to forecast variables 310 in FIG. 4. cognitive forecasting system 302 is an example of application 105A/105B of FIG. 1.

An embodiment of the diagnostic series generator 402 receives input data for a plurality of forecast variables 412. The diagnostic series generator 402 includes a plurality of forecast generators 404A-404E arranged in parallel to receive respective forecast variables. The diagnostic series generator 402 also includes a plurality of diagnostic report generators 406A-406E arranged in parallel to receive forecasts from respective forecast generators 404A-404E. The diagnostic series generator 402 further includes a plurality of cognitive diagnostic evaluators 408A-408E arranged in parallel, each connected to receive diagnostic information from respective diagnostic report generator 406A-406E.

In an embodiment, each forecast generator 404 generates t/s forecasts per variable, where t is the forecasting term and s is the step size and both are set to a common time dimension (e.g., minutes, hours, days, etc.). Each diagnostic report generator 406 generates p diagnostic plots per forecast, for a total of (pt)/s plots per variable. Each cognitive diagnostic evaluator 408 generates one diagnostic value 414 per forecast (i.e., one for every p plots) for a total of t/s diagnostic values per variable. The diagnostic values 414 for each variable are stored in a respective forecast diagnostic array.

In an embodiment, the forecast generators 404A-404E forecast future values for the forecast variables using an Autoregressive Integrated Moving Average (ARIMA) model that uses parameters such as the number of time lags (or "order") of the autoregressive model and the number of times the data have had past values subtracted (or "degree of differencing"). As another example, in an embodiment, the forecast generators 404A-404E detects strong seasonal tendencies in the time series data of the forecast variable and applies a Seasonal ARIMA (SARIMAX) model, which uses autoregressive terms and moving average terms for seasonal parts of the ARIMA model to factor in the seasonality of the input data trend to obtain a forecast for the forecast variable.

An embodiment of the cognitive diagnostic evaluators 408A-408E configure image classification models 415A-415E to classify one or more plots generated by the diagnostic report generators 406A-406E. The plots may be viewed in real time or captured and viewed at a later time. In one embodiment, the image classification models 415A-415E are neural network-based models, for example a convolutional neural network (CNN). During the configuration process, an embodiment uses labelled images of various plots to train the neural network-based models 415A-415E to classify a plot according to the training. For example, an image classification model 415 that is intended to classify a plot according to error levels in the plot. The granularity of the error level detection made by the CNN 415 will depend on the number of classes the CNN 415 is trained to identify. For example, an image classification model that is intended to classify an image comprising a plot according to the accuracy of the forecast, for example from 0% accurate to 100% accurate.

In an embodiment, the forecast generators 404A-404E generate forecasts and diagnostic report generators 406A-406E each create a plurality of diagnostic plots per forecast. In one such embodiment, cognitive diagnostic evaluators 408A-408E use one or more CNNs to classify each of the diagnostic plots per forecast. The cognitive diagnostic evaluators 408A-408E each output a single value per forecast by averaging the results of the classifications of the plural diagnostic plots per forecast. For example, an embodiment generates a standardized residual line plot, a residual histogram and estimated density plot, a residual quantile (Q-Q) plot, and a residual autocorrelation plot all related to a single forecast. An embodiment of the cognitive diagnostic evaluator classifies all four plots individually and assigns each a value from 0 to 100 depending on the accuracy of each plot. The accuracy values for the four diagnostic plots are then averaged together to arrive at a single number indicative of the accuracy of the forecast.

Figure 4B:
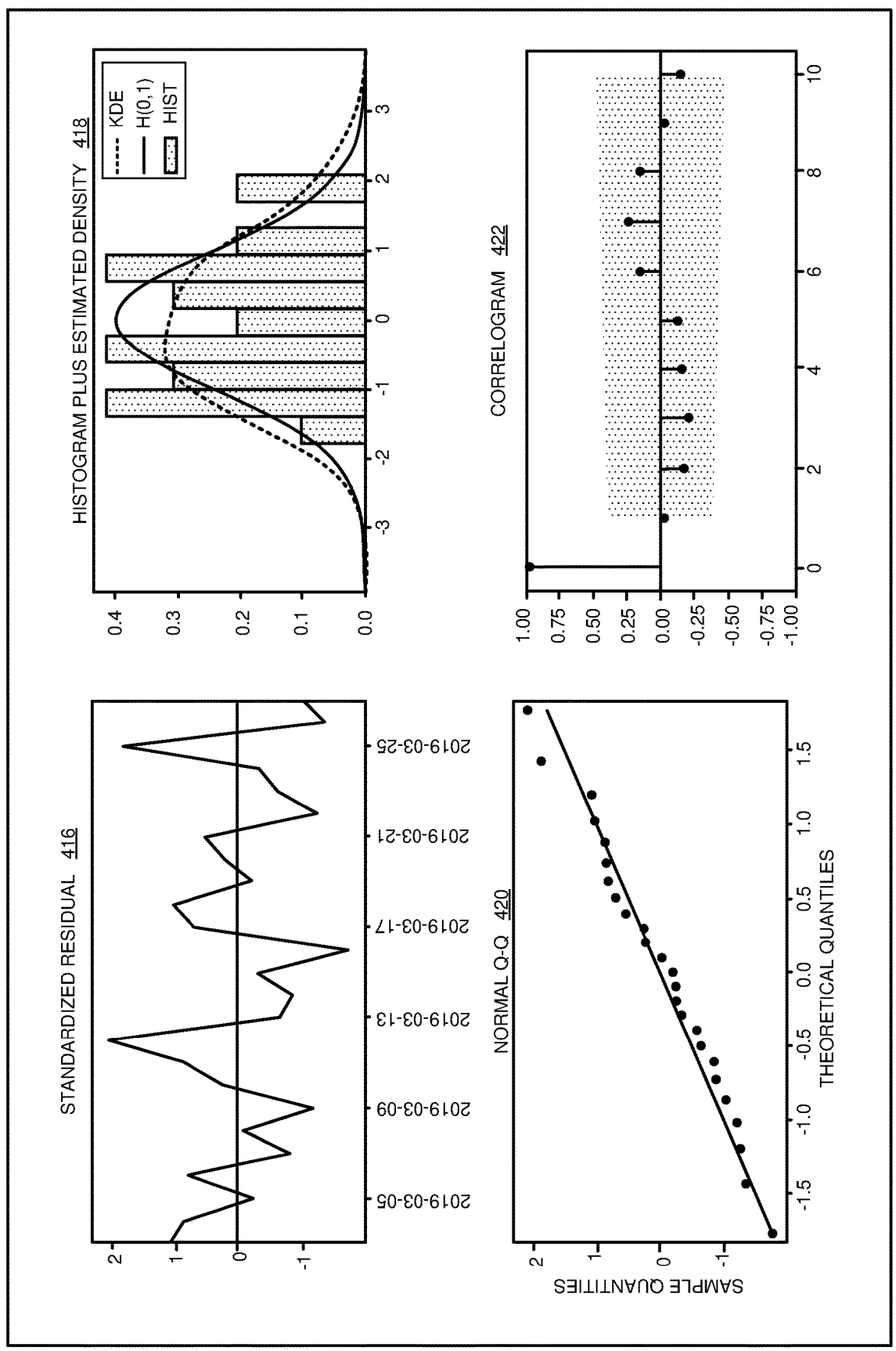
FIG. 4B depicts a diagram of example diagnostics plots in accordance with an illustrative embodiment.

With reference to FIG. 4B, this figure depicts a diagram of example diagnostics plots 416, 418, 420, and 422 in accordance with an illustrative embodiment. In some embodiments, the diagnostic report generators 406A-406E each output one or more plots that can include one or more of the example plots shown in FIG. 4B, which include a standardized residual line plot 416, a residual histogram and estimated density plot 418, a residual quantile (Q-Q) plot 420, and a residual autocorrelation plot 422.

A residual line plot 416 is a line plot that provides a visual indication of residual forecast error values relative to a central zero axis. The error values and line plot 416 should appear random; otherwise, the presence of a pattern indicates that the forecasting model should be adjusted or replaced with a different algorithm. For example, in an embodiment, the diagnostic series generator 402 uses an ARIMA model to calculate a forecast and generate a residual line plot 416. The cognitive diagnostics evaluator then analyzes the residual line plot 416 and, if the cognitive diagnostics evaluator detects a seasonal or cyclic pattern in the input data or the plot 416, the diagnostic series generator 402 informs a user to give the user an opportunity to use a different model, or in an automated embodiment the diagnostic series generator 402 instructs the forecast generator to re-calculate the forecast using a different model, such as a SARIMAX model, which is better suited for data that includes seasonal patterns.

A residual histogram and estimated density plot 418 (or "histogram and density plot") provides a visual indication of anomalies in the distribution of residual errors in a forecast. Ordinarily a histogram and density plot 418 will have a somewhat Gaussian appearance. The presence of a non-Gaussian distribution or a large skew indicates that the forecasting model should be adjusted or replaced.

A residual Q-Q plot 420 provides a visual indication of a comparison between two distributions, showing the degree of similarity or difference between the distributions. For example, in an embodiment the forecast values are compared to a Gaussian distribution and the differences are plotted as a scatter plot 420. The scatter plot 420 in this example should closely follow a diagonal line extending from the origin in a direction consistent with growing values on the horizontal and vertical axes. Otherwise, the presence of significant deviations will sometimes indicate that autoregression parameter(s) are not ideal and have room for improvement. The plot 420 will typically be useful for identifying values that deviate from expectations.

A residual autocorrelation plot 422 provides a visual indication of a comparison between an observation and observations at prior time steps. For this plot 422, the expectation is to find a lack of autocorrelation between the two distributions. The plot 422 shows autocorrelation scores relative to a threshold of significance. The presence of significant deviations will sometimes indicate that autoregression parameter(s) are not ideal and have room for improvement.

With reference to FIG. 5, this figure depicts a block diagram of an example configuration 500 for generating forecast features in accordance with an illustrative embodiment. The example embodiment includes a feature vector generator 502 that receives diagnostic values 512. In a particular embodiment, feature vector generator 502 is an example of feature vector generator 306 of FIG. 3, and diagnostic values 512 is an example of diagnostic values 414 of FIG. 4.

In an embodiment, the feature vector generator 502 includes a Hopfield network 504 where each of the diagnostic variables 506A-506E becomes a node that is fully connected to every other node. Each node represents a single forecasted variable that corresponds to the diagnostic values 506A-506E. In an embodiment, the diagnostic values 506A-506E are fed into the Hopfield network to find the contribution they have to the activation function of a connected node. The contribution provides a weight to the edge connecting the nodes. From a particular node, the edges that link to each diagnostic variable are ordered. The order of the relations between forecast variables can be used to determine how far down a forecaster's forecast we should traverse when including in a final forecast.

In an embodiment, since the node values are known, the Hopfield network 504 will process the nodes until it learns the weights of each of the connections between the nodes. Thus, in some embodiments, the weights of the Hopfield network 504 are learned. In some embodiments, the Hopfield network 504 includes a number of totally connected equal to the number of forecast variables 412 (shown in FIG. 4A). In some embodiments, once the Hopfield network 504 has learned all the weights, the feature vector generator 502 will rank the nodes according to each node's connected edges. The feature vector generator 502 will rank the edges to each node, and then the rank the nodes according to the edge weights. The feature vector generator 502 will then form three feature vectors 514, each modified according to the weights: A Long Term feature vector using the highest weighted edges, a Short Term feature vector using the lowest weighted edges, and a Middle Term feature vector using an average of the middle edge values. The vectors of each of the three feature vectors are unioned together and the three unioned feature vectors are output to the cognitive forecaster 602.

Figure 6:
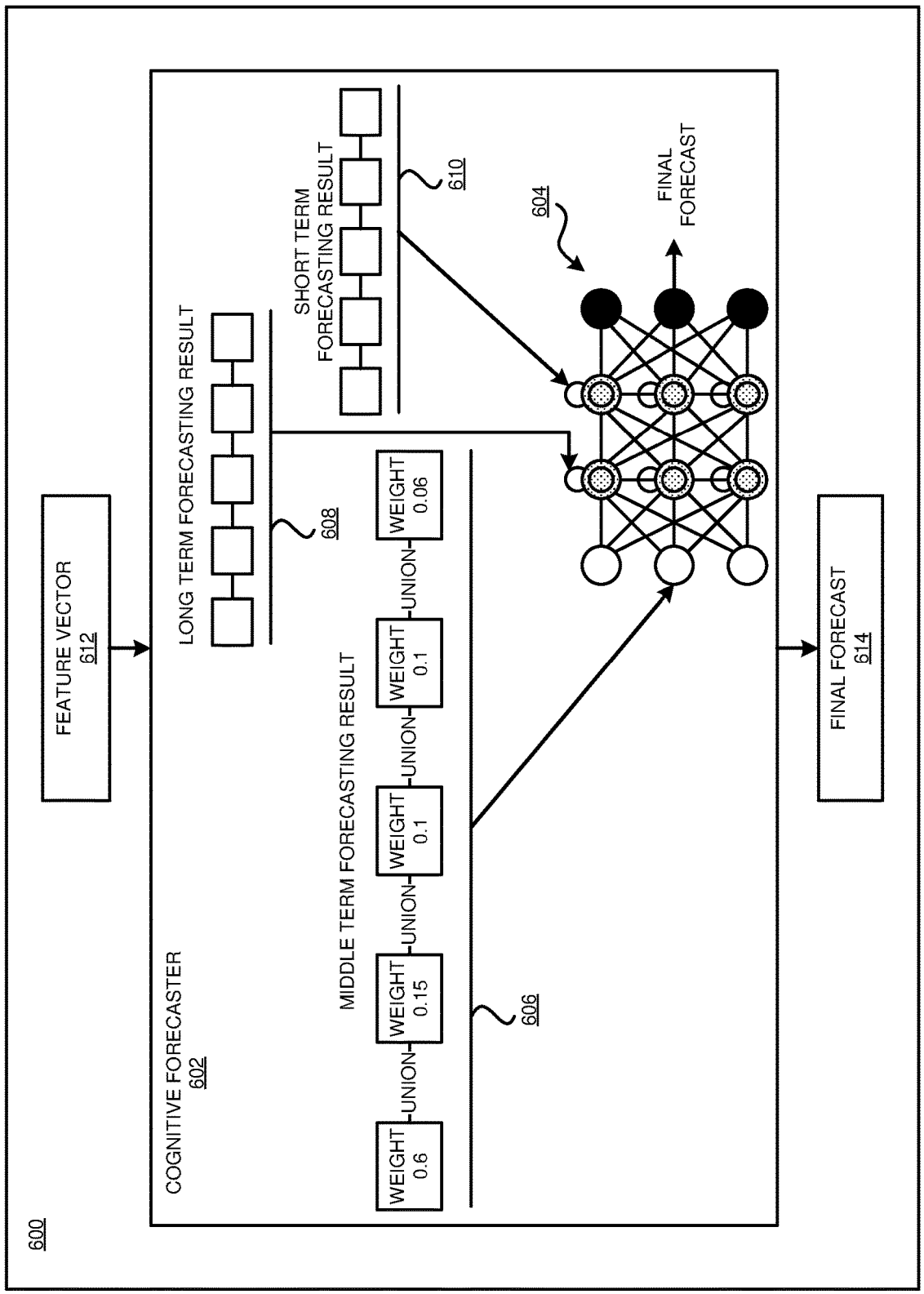
FIG. 6 depicts a block diagram of a cognitive forecaster in accordance with an illustrative embodiment.

With reference to FIG. 6, this figure depicts a block diagram of a forecasting environment 600 in accordance with an illustrative embodiment. The example embodiment includes a cognitive forecaster 602 that receives feature vectors 612. In a particular embodiment, cognitive forecaster 602 is an example of cognitive forecaster 308 of FIG. 3, and feature vectors 612 is an example of feature vectors 514 of FIG. 5.

In an embodiment, the cognitive forecaster 602 receives the three feature vectors 606, 608, and 610, which are examples of the feature vectors 612. The cognitive forecaster 602 uses the three feature vectors 606, 608, and 610 as inputs into a neural network 604. In an embodiment, the neural network 604 is a Long Short-Term Memory (LSTM) neural network 604. In an embodiment, the LSTM 604 is trained using historic data split such that half is test data and half is training data to train the LSTM 604 for generating revised forecasts based on the correlations calculated by the Hopfield network 504. In an embodiment, the cognitive forecaster 602 uses the Middle Term feature vector 606 as the input to the LSTM and uses the Long Term feature vector 608 and Short Term feature vector 610 as inputs to short term and long term memory inputs to the LSTM 604. In this way, the LSTM network 604 will retain memory of different time horizons that bound the input forecast.

Figure 7:
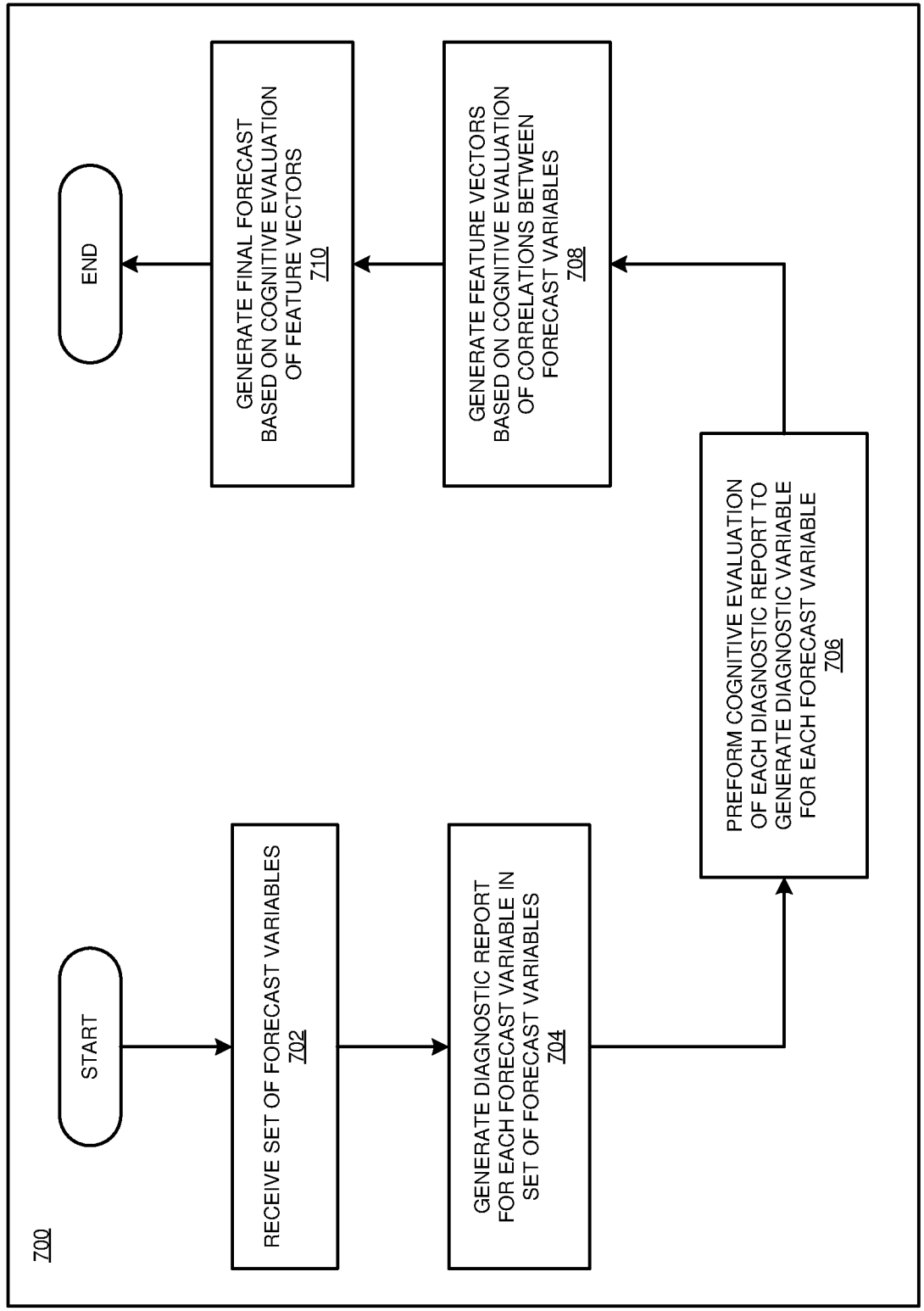
FIG. 7 depicts a flowchart of an example process for Deep Contour correlated forecasting in accordance with an illustrative embodiment.

With reference to FIG. 7 this figure depicts a flowchart of an example process 700 for creating a forecaster's forecast in accordance with an illustrative embodiment. In a particular embodiment, the cognitive forecasting system 302 carries out the process 700.

In an embodiment, at block 702, the process receives a set of forecast variables. Next, at block 704, the process generates diagnostic reports for each forecast variable in set of forecast variables. In some embodiments, the generating of diagnostic reports includes generating tis forecasts per variable, where t is the forecasting term and s is the step size and both are set to a common time dimension (e.g., minutes, hours, days, etc.), and then generating diagnostic reports that comprise p diagnostic plots per forecast, for a total of (pt)/s plots per variable. Each cognitive diagnostic evaluator generates one diagnostic value per forecast (i.e., one for every p plots) for a total of tis diagnostic values per variable. Next, at block 706, the process performs cognitive evaluation of each diagnostic report to generate diagnostic variables for each forecast variable.

Next, at block 708, the process generates feature vectors based on cognitive evaluation of correlations between forecast variables. In some embodiments, the processing of the feature vectors includes processing the feature vectors using a Hopfield network. Next, at block 710, the process generates a final forecast based on cognitive evaluation of feature vectors. In some embodiments, the generating of a final forecast includes generating the final forecast using an LSTM.

In some embodiments, the process removes selected superpixels or groups of superpixels from the image. Next, at block 706, the DNN classifier predicts a class for the modified image. At block 708, the process determines whether the modified image has a classification that is different from that of the original image. If the classification is still the same ("No" at block 708), the process continues to block 710 where a copy of the modified image is stored. In some embodiments, if a less-modified image is stored from a previous iteration of the loop from block 706 to 712, the current image overwrites the previously-stored image so that the stored image is always an image that has been most heavily modified without being reclassified at block 708. Next, at block 712, the process removes more of the modified image. The process then loops back to block 706, where the DNN classifier predicts a class for the modified image.

Eventually the image will have been modified to such an extent that the DNN will predict a different class for the modified image. At this point, the process continued to block 724, where the image stored at block 710 to verify whether it satisfies other parameters, such as L regularization parameters. If so, the image is added to an array of images obtained from the process from block 702 to 712. At block 716, an algorithm controller determines whether to continue with another copy of the original image by returning to block 702. Otherwise, the process continues to block 718, where the array of saved images is sorted to find an image having more recognizable results in a smallest remaining portion of the original input image. At block 720, the image best satisfying the criteria is output as the PP image.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, by a processor, input data for historic values of a first input variable;
creating, by the processor, forecast data for future values of the first input variable using the historic values of the first input variable;
generating, by the processor, diagnostic data based on a diagnostic analysis of the forecast data;
creating, by the processor, a first diagnostic variable that includes a first diagnostic value from a first cognitive process, wherein the first cognitive process determines the first diagnostic value based on the diagnostic data;
computing, by comparing relative to a threshold, a first time-series data of the first diagnostic value of the first diagnostic variable with a second time-series data of a second diagnostic value of a second diagnostic variable, that a correlation exists between the first diagnostic variable and the second diagnostic variable, the first diagnostic variable being distinct from the second diagnostic variable;
computing, for the correlation, a correlation value;
adjusting to produce an adjusted time-series data, using the correlation value, a value in the first time-series data of the first diagnostic value of the first diagnostic variable;
generating, by the processor, a feature vector using the adjusted time-series data in a second cognitive process; and
generating, by the processor, a final forecast using the feature vector as an input for a cognitive forecasting process.

2. The computer implemented method of claim 1, wherein the creating of the forecast data includes using an autoregressive model on the historic values of the first input variable.

3. The computer implemented method of claim 1, wherein the creating of the forecast data includes performing a plurality of forecasts for respective forecast terms such that the forecast data includes data for a plurality of forecasts.

4. The computer implemented method of claim 3, wherein the generating of the diagnostic data includes performing the diagnostic analysis on each of the plurality of forecasts such that the diagnostic data includes data for diagnostic results associated with respective forecasts.

5. The computer implemented method of claim 4, wherein the generating of the diagnostic data includes generating image data for a plurality of diagnostic plots, wherein the plurality of diagnostic plots includes a diagnostic plot for each of the diagnostic results.

6. The computer implemented method of claim 5, wherein the first cognitive process includes using a convolutional neural network (CNN) to evaluate the image data for at least one of the diagnostic plots.

7. The computer implemented method of claim 5, wherein the plurality of diagnostic plots includes a plurality of groups of diagnostic plots, wherein each group of diagnostic plots includes plots for a plurality of different diagnostic tests, and wherein each group of diagnostic plots is associated with a respective forecast.

8. The computer implemented method of claim 7, wherein the plots for the plurality of different diagnostic tests include a standardized residual line plot, a residual histogram and estimated density plot, a residual quantile (Q-Q) plot, and a residual autocorrelation plot.

9. The computer implemented method of claim 7, wherein the first cognitive process includes using a first CNN to evaluate the image data for only a first one of the plurality of different diagnostic tests and using a second CNN to evaluate the image data for only a second one of the plurality of different diagnostic tests.

10. The computer implemented method of claim 1, wherein the generating of the feature vector based on the second cognitive process includes using a Hopfield network with the first and second diagnostic variables at respective first and second nodes of the Hopfield network.

11. The computer implemented method of claim 10, wherein the generating of the feature vector using the Hopfield network includes assigning a feature value to the feature vector based on an edge weight determined by the Hopfield network for an edge between the first and second nodes.

12. The computer implemented method of claim 11, wherein the generating of the final forecast includes using the feature value as a middle term input for a Long Short-Term Memory (LSTM) neural network.

13. The computer implemented method of claim 11, wherein the generating of the final forecast includes using the feature value as a memory input for an LSTM neural network.

14. A computer usable program product for generating contrastive information for a classifier prediction, the computer usable program product comprising a computer-readable storage device, and program instructions stored on the storage device, the stored program instructions comprising:
- program instructions to receive, by a processor, input data for historic values of a first input variable;
- program instructions to create, by the processor, forecast data for future values of the first input variable using the historic values of the first input variable;
- program instructions to generate, by the processor, diagnostic data based on a diagnostic analysis of the forecast data;
- program instructions to create, by the processor, a first diagnostic variable that includes a first diagnostic value from a first cognitive process, wherein the first cognitive process determines the first diagnostic value based on the diagnostic data;
- program instructions to compute, by comparing relative to a threshold, a first time-series data of the first diagnostic value of the first diagnostic variable with a second time-series data of a second diagnostic value of a second diagnostic variable, that a correlation exists between the first diagnostic variable and the second diagnostic variable, the first diagnostic variable being distinct from the second diagnostic variable;
- program instructions to compute, for the correlation, a correlation value;
- program instructions to adjust to produce an adjusted time-series data, using the correlation value, a value in the first time-series data of the first diagnostic value of the first diagnostic variable;
- program instructions to generate, by the processor, a feature vector using the adjusted time-series in a second cognitive process; and
- program instructions to generate, by the processor, a final forecast using the feature vector as an input for a cognitive forecasting process.

15. The computer usable program product of claim 14, wherein the creating of the forecast data includes performing a plurality of forecasts for respective forecast terms such that the forecast data includes data for a plurality of forecasts.

16. The computer usable program product of claim 15, wherein the generating of the diagnostic data includes:
- performing the diagnostic analysis on each of the plurality of forecasts such that the diagnostic data includes data for diagnostic results associated with respective forecasts; and
- generating image data for a plurality of diagnostic plots, wherein the plurality of diagnostic plots includes a diagnostic plot for each of the diagnostic results.

17. The computer usable program product of claim 14, wherein the generating of the feature vector based on the second cognitive process includes using a Hopfield network with the first and second diagnostic variables at respective first and second nodes of the Hopfield network.

18. A computer system comprising a processor, a computer-readable memory, and a computer-readable storage device, and program instructions stored on the storage device for execution by the processor via the memory, the stored program instructions comprising:
- program instructions to receive, by a processor, input data for historic values of a first input variable;
- program instructions to create, by the processor, forecast data for future values of the first input variable using the historic values of the first input variable;
- program instructions to generate, by the processor, diagnostic data based on a diagnostic analysis of the forecast data;
- program instructions to create, by the processor, a first diagnostic variable that includes a first diagnostic value from a first cognitive process, wherein the first cognitive process determines the first diagnostic value based on the diagnostic data;
- program instructions to compute, by comparing relative to a threshold, a first time-series data of the first diagnostic value of the first diagnostic variable with a second time-series data of a second diagnostic value of a second diagnostic variable, that a correlation exists between the first diagnostic variable and the second diagnostic variable, the first diagnostic variable being distinct from the second diagnostic variable;
- program instructions to compute, for the correlation, a correlation value;
- program instructions to adjust to produce an adjusted time-series data, using the correlation value, a value in the first time-series data of the first diagnostic value of the first diagnostic variable;
- program instructions to generate, by the processor, a feature vector using the adjusted time-series data in a second cognitive process; and
- program instructions to generate, by the processor, a final forecast using the feature vector as an input for a cognitive forecasting process.

19. The computer system of claim 18, wherein the creating of the forecast data includes performing a plurality of forecasts for respective forecast terms such that the forecast data includes data for a plurality of forecasts.

20. The computer system of claim 18, wherein the generating of the feature vector based on the second cognitive process includes using a Hopfield network with the first and second diagnostic variables at respective first and second nodes of the Hopfield network.

* * * * *